(12) United States Patent
Perumalla et al.

(10) Patent No.: US 10,810,471 B1
(45) Date of Patent: Oct. 20, 2020

(54) INTELLIGENT COALESCING OF MEDIA STREAMS

(71) Applicant: Amazon Technologies, Inc., Seattle, WA (US)

(72) Inventors: Poorna Chand Srinivas Perumalla, Seattle, WA (US); Nagajyothi Nookula, Seattle, WA (US); Eduardo Manuel Calleja, San Francisco, CA (US); Aashish Jindia, San Francisco, CA (US); Vinay Hanumaiah, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 208 days.

(21) Appl. No.: 15/933,152

(22) Filed: Mar. 22, 2018

(51) Int. Cl.
  *G06K 9/62* (2006.01)
  *G06N 3/08* (2006.01)
  *G06K 9/00* (2006.01)

(52) U.S. Cl.
  CPC ....... *G06K 9/6293* (2013.01); *G06K 9/00315* (2013.01); *G06K 9/6257* (2013.01); *G06N 3/086* (2013.01)

(58) Field of Classification Search
  CPC ............. G06K 9/6293; G06K 9/00315; G06K 9/6257; G06N 3/086
  See application file for complete search history.

(56) References Cited

U.S. PATENT DOCUMENTS

| | | | | |
|---|---|---|---|---|
| 9,191,553 | B2 * | 11/2015 | Schlieski | H04N 5/04 |
| 2007/0153089 | A1 * | 7/2007 | Cooper | H04N 17/00 |
| | | | | 348/194 |
| 2008/0043144 | A1 * | 2/2008 | Amir | G06K 9/00711 |
| | | | | 348/469 |
| 2010/0007665 | A1 * | 1/2010 | Smith | G06T 13/40 |
| | | | | 345/473 |
| 2011/0261257 | A1 * | 10/2011 | Terry | G06K 9/00221 |
| | | | | 348/515 |
| 2012/0328062 | A1 * | 12/2012 | Kang | H04N 5/04 |
| | | | | 375/357 |
| 2013/0278826 | A1 * | 10/2013 | Schlieski | H04N 5/04 |
| | | | | 348/515 |
| 2017/0061966 | A1 * | 3/2017 | Marcheret | G10L 15/25 |
| 2017/0353749 | A1 * | 12/2017 | Gurfinkel | H04N 21/242 |
| 2018/0277132 | A1 * | 9/2018 | LeVoit | G10L 25/51 |
| 2019/0147229 | A1 * | 5/2019 | Zatepyakin | G06K 9/00248 |
| | | | | 382/103 |

* cited by examiner

*Primary Examiner* — Kim Y Vu
*Assistant Examiner* — Molly Delaney
(74) *Attorney, Agent, or Firm* — Nicholson De Vos Webster & Elliott, LLP

(57) ABSTRACT

Techniques for intelligent coalescing of media streams are described. A coalesce engine receives multiple media streams, such as audio or video streams, that are misaligned. The coalesce engine can analyze the media streams by comparing representations of elements of the media streams to detect the misalignment. The coalesce engine may determine an offset amount representing the misalignment, and if the offset amount meets or exceeds a threshold the coalesce engine can work to eliminate the misalignment by introducing one or more artificial delays before sending elements of ones of the media streams that are "ahead" of others of the streams. The coalese engine can additionally or alternatively send feedback to sources of the media streams, causing the source(s) to attempt to mitigate the misalignment.

20 Claims, 12 Drawing Sheets

U.S. 10,810,471 B1

INTELLIGENT COALESCING OF MEDIA STREAMS

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Figure 1:
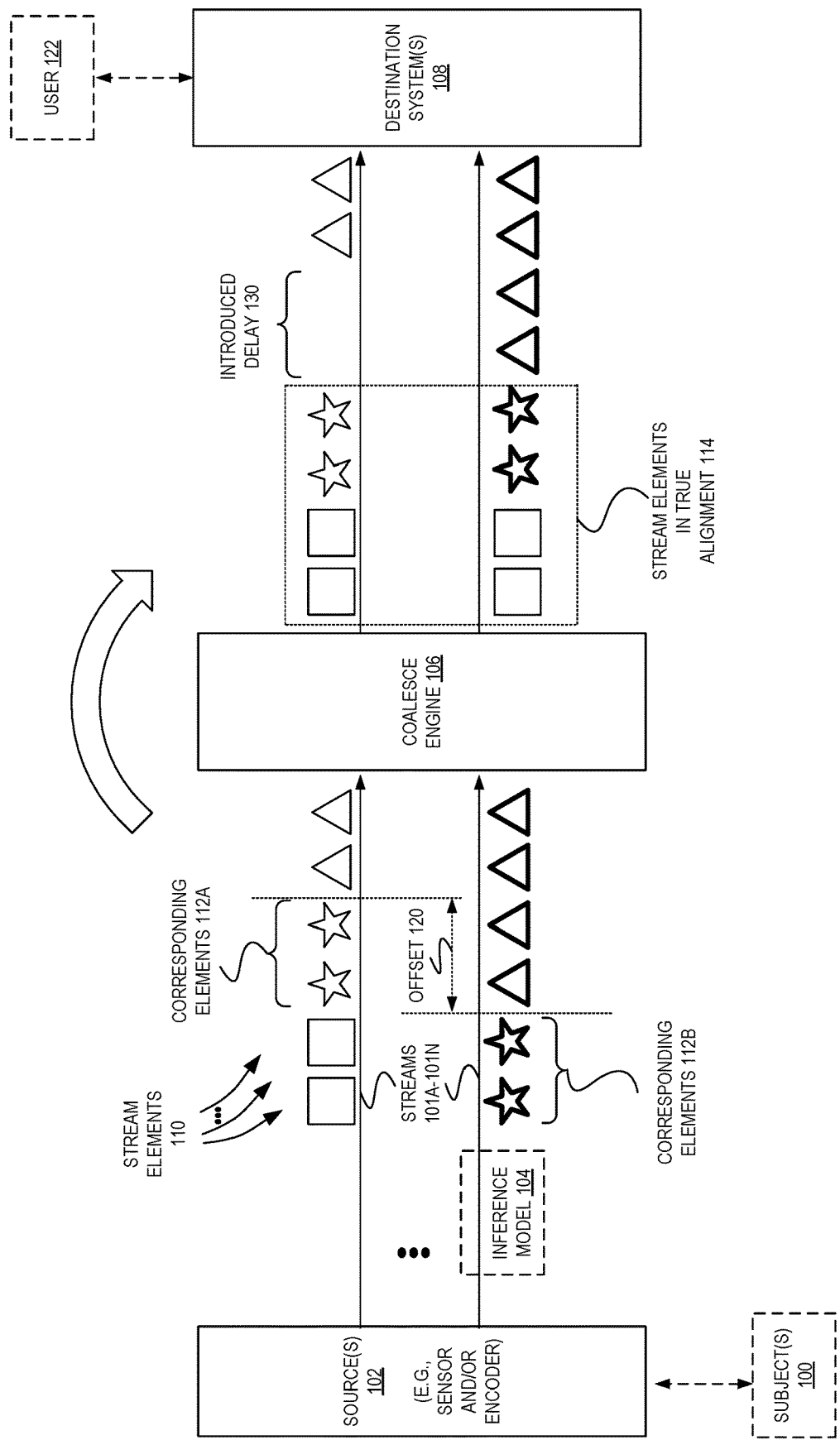
FIG. 1 is a diagram illustrating an environment for intelligent coalescing of media streams according to some embodiments.

Various embodiments of methods, apparatus, systems, and non-transitory computer-readable storage media for intelligent coalescing of media streams are described. According to some embodiments, a coalesce engine can dynamically re-align out-of-sync media streams, such as when one stream is slowed down due to operations being performed on it (e.g., via a machine learning (ML) model or models) while other streams may not be subjected to the same processing-based delays. In some embodiments, a coalesce engine receives a plurality of media streams in which elements of a first media stream are received out of alignment with corresponding elements of a second data stream. The coalesce engine analyzes the elements of the first and second media streams to identify a true alignment between the elements of the first media stream and of the second media stream, and sends the first media stream and the second media stream according to the true alignment by introducing one or more delays before sending one or more elements of the first media stream. Accordingly, embodiments disclosed herein can eliminate choppy, out-of-sync media streams that would be erroneous and/or non-sensical when used by other systems and/or presented to users. Embodiments disclosed herein can perform the intelligent coalescing without needing a priori configuration information about the particular sources, types, or numbers of media streams to be aligned, and thus may be easily applied in a variety of technical environments.

Many types of media streams are in use for a variety of applications. For example, video streams are often used to provide real (or quasi-real) time video to users, e.g., to watch a sporting event, view a webcam, etc. A video stream thus carries elements that represent moving imagery. As one example, a video stream may be a Motion JPEG ("M-JPEG" or "MJPEG") stream, which is a video compression format where each video frame or interlaced field of a digital video sequence is compressed separately as a JPEG image. Originally developed for multimedia PC applications, M-JPEG is now used by video-capture devices such as digital cameras, Internet Protocol (IP) cameras, and webcams, as well as by non-linear video editing systems. As another example, a video stream may be a H.264 (or MPEG-4 Part 10, Advanced Video Coding (MPEG-4 AVC)) stream, which is a block-oriented motion-compensation-based video compression standard. H.264 is currently a commonly-used format for the recording, compression, and distribution of video content.

As another example, audio streams that carry auditory data may be used, for example, to provide a remote user with the ability to listen to the sound generated in a room or event (e.g., a concert), music, a "radio" station, etc. Audio streams may be lossy and compressed (e.g., Advanced Audio Coding (AAC), MP3, Ogg Vorbis, Windows Media Audio (WMA)); lossless and compressed (e.g., Apple Lossless Audio Codec (ALAC), Free Lossless Audio Codec (FLAC)); lossless and uncompressed (e.g., Audio Interchange File Format (AIFF), FLAC (uncompressed), Waveform Audio File Format (WAV), RAW); etc.

In many scenarios, two different streams may be used together for a common purpose. For example, some electronic devices may generate multiple media streams from a common subject (e.g., an audio stream from a microphone and a video stream from an optical sensor stack, both possibly capturing aspects of a common environment/region/area). One or multiple of these streams may acted upon by machine learning (ML) models and/or other pre-/post-processing tasks of different nature—which may occur directly on the electronic device itself, or at a different electronic device. As a result, due to differences between the types of operations involved for the different media streams, variable delays may be introduced into some or all of the media streams. For example, it could be the case that ML models are being run for inference using a video stream—e.g., to perform object detection in the video—but when the video stream and another one or more streams (e.g., a corresponding audio stream) need to be merged (e.g., to create a unified view, or to be used for causality detection purposes), the consolidation may not work well due to the introduction of variable delays in the various media streams. As a result, the different types and/or amounts of processing for the different media streams can lead to a choppy and out-of-sync unification, such as when one media stream comes through immediately and the other media stream is delayed. For example, a portion of an audio stream carrying voice data may be shifted a substantial number of frames earlier than the corresponding video frames from the video stream and thus, a consolidation of the streams could result in presenting, to a user, the sound of a person talking while that person is not shown as talking, or perhaps not even being shown whatsoever.

As an example, a camera device may generate multiple video media streams—e.g., an H.264 stream and an MJPEG stream (and potentially one or more audio streams and/or other video streams). The camera device may have sufficient resource capabilities to execute an object detection model using the MJPEG stream (e.g., having elements that carry individual, compressed images) to thus perform inference, e.g., to identify locations of objects and to generate bounding boxes that can frame the detected objects (e.g., by overlaying the bounding boxes over the H.264 stream). As a result, elements of this stream may be delayed compared to corresponding elements of the H.264 stream, which was not processed in this manner, which could lead to an inadvertent drawing of a bounding box labeled "dog" (from the bounding box/MJPEG stream) over an incorrect object (e.g., a person) or nothing at all as depicted in the H.264 stream. As other examples, elements of streams could be processed (e.g., using one or more ML models) to perform color adjustments, add subtitles, perform a counting of objects in the stream (e.g., how many pizzas are currently displayed or have been displayed over time, etc.), detect events such as the existence of a vehicle operator who may be under the influence (e.g., via detecting drowsy eyes, sporadic behavior, twitches, etc.) or a burglary, and such processed elements need to be re-aligned with other, related streams to maintain the benefit of the processing and to avoid erroneous results.

Accordingly, when multiple streams are involved in which one or more of the media streams are processed in some manner—introducing some amount of delay for these media streams—it is important to re-align the streams in time synchronicity to a "true" alignment so that corresponding elements of the streams can be properly used together.

Embodiments disclosed herein can minimize or eliminate the misalignment of multiple media streams. FIG. 1 is a diagram illustrating an environment for intelligent coalescing of media streams according to some embodiments. The environment includes a coalesce engine 106 that receives streams 101A-101N, detects misalignment between ones of the streams, and eliminates (or substantially reduces) the misalignment of the streams.

The streams 101A-101N are generated by one or more sources 102 and may be, for example, media streams carrying audio and/or visual data elements. Multiple ones of the streams may relate to a common subject 100—e.g., a region/area near the one or more sources 102 that the source(s) 102 sense. The source(s) 102 may be, for example, a sensor device and/or a hardware or software encoder.

The coalesce engine 106 can be implemented using software, hardware, or a combination of both, as part of one or more electronic devices. In some embodiments, the coalesce engine 106 and the source(s) 102 are implemented within a same electronic device and thus the coalesce engine 106 may receive the streams 101A-110N via one or more buses or interconnects, though in other embodiments the coalesce engine 106 is in a different electronic device than a device that includes the source(s) 102, and thus the coalesce engine 106 may receive the streams 101A-101N via a wired or wireless network interface, for example. The coalesce engine 106, as part of aligning the streams 101A-101N, may send the stream elements on to one or more destination systems 108. The destination system(s) 108 may be implemented using software, hardware, or a combination thereof, as part of one or more electronic devices. The destination system(s) 108 can, for example, combine multiple streams 101A-101N into a format (e.g., a video with or without audio) that can be viewed by a user 122, analyze the multiple streams as part of a monitoring system (e.g., security monitoring), or perform other types of operations useful for any number of other applications.

As described herein, one or multiple of the streams 101A-101N may be out-of-synchronization with others of the streams when received by the coalesce engine 106. As shown in FIG. 1, a number of stream elements 110 (e.g., a frame of a video steam, a "chunk" of audio data of a particular duration, etc.) of a first stream 101A are shown with thin borders via representations of two squares, two stars, and two triangles. Similarly, elements of a second stream (e.g., stream 101B) are shown with thick borders as two stars and four triangles. Although in some cases these streams carry data (stream elements) that are related to a common subject 100, the actual streams are typically different in that they carry different types of data (e.g., audio versus video), data obtained from different perspectives, data encoded according to a different scheme/protocol, etc.

For the sake of understanding, this example assumes that the elements of the second stream 101B have been delayed (compared to the elements of the first stream 101A) due to having been processed by an inference model 104 (e.g., a machine learning model) and thus, corresponding elements 112B of the second stream 101B (here shown as two stars) are offset 120 from their corresponding elements 112A of the first stream 101A. This offset 120 can be represented as a difference of time between corresponding elements from each of the streams that should have been co-aligned but, for some reason (here, due to the inference model 104), were not co-aligned and thus would not be received at a same time.

As described later herein with regard to FIGS. 2-6, the coalesce engine 106 can, upon receipt of the streams 101A-101N, analyze the streams 101A-101N to automatically detect the existence of one or more misalignments. For example, with two streams one may be misaligned ahead of the other stream by a particular offset; as another example, with three streams, two or all three of the streams may be misaligned with the same or different offsets.

Upon detecting one or more misalignments, the coalesce engine 106 can re-align the streams into a "true" alignment. For example, as shown in FIG. 1, the coalesce engine 106 can detect the size of offset 120 and cause the streams to be emitted (or, sent on) by the coalesce engine 106 in a true alignment 114. In some embodiments, the true alignment 114 can be created by introducing one or more delays 130 between elements in ones of the streams (here, stream 101A) so that the corresponding elements 112A are sent at the same time as corresponding elements 112B. As a result, the streams will be received by the destination system(s) 108 in the true alignment 114 (or in much closer alignment than if the coalesce engine 106 had not been involved, as other misalignments could potentially be introduced between the coalesce engine 106 and the destination system(s) 108, though through proper placement of the coalesce engine 106 to be as close to the destination system(s) 108 as possible, the incidence of such misalignments can largely be eliminated).

Notably, although this figure and others depict the use of only two streams, such illustration is used for the sake of ease of understanding and clarity of the disclosure; thus, it is to be understood that in some embodiments the coalesce engine 106 can accommodate more than two streams, and can detect and remedy multiple different misalignments using the techniques disclosed herein.

Figure 2:
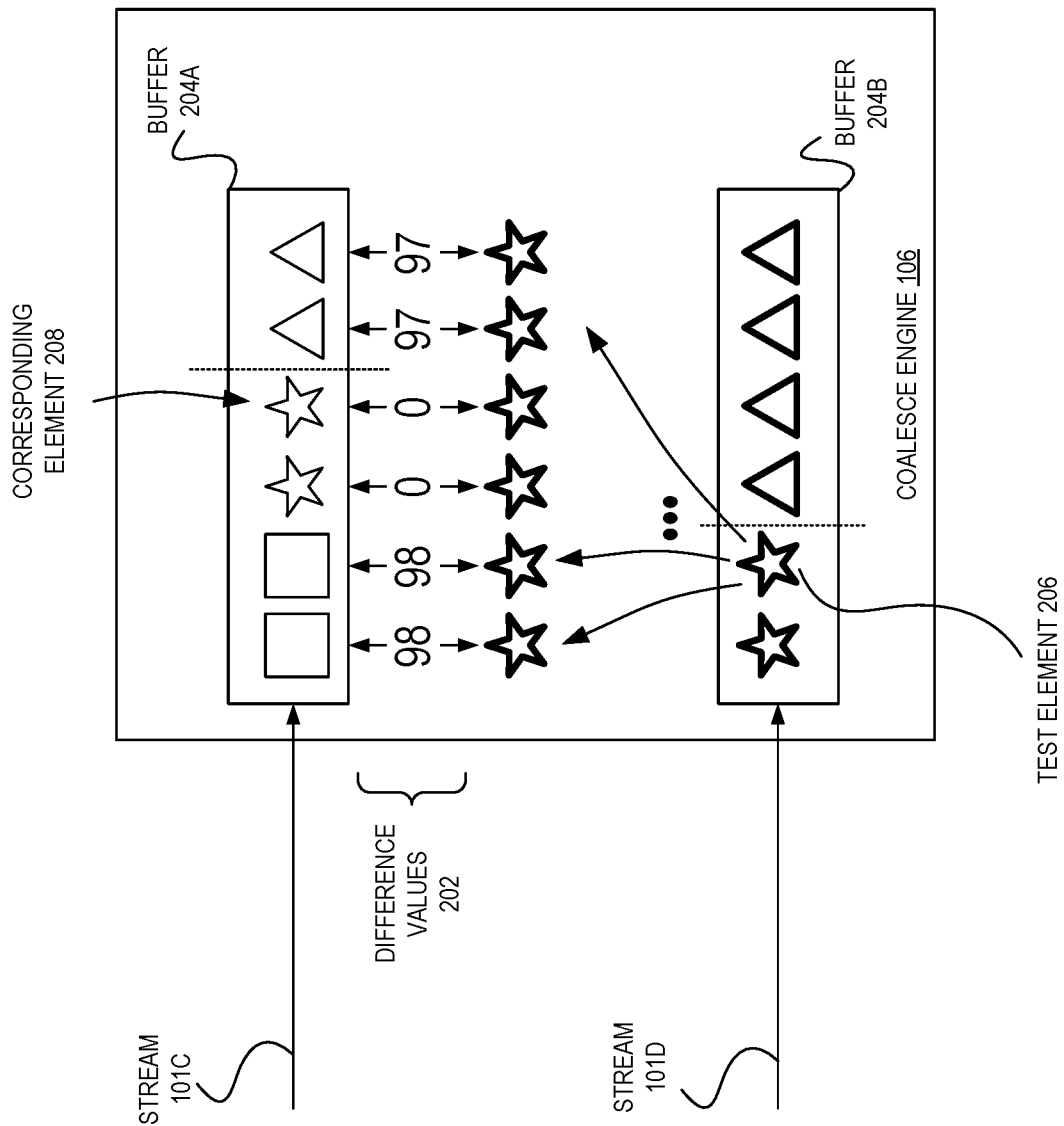
FIG. 2 is a diagram illustrating an environment for intelligent coalescing of two image/video media streams using single element comparison according to some embodiments.

To detect the existence of a misalignment, the coalesce engine 106 can utilize a variety of techniques. As one example, it could be the case that multiple media streams carry timestamps for particular elements within the streams, and thus the coalesce engine 106 can detect that elements with a particular timestamp are received out-of-alignment with corresponding elements of another stream that are marked with the timestamp (or a similar timestamp). However, in many cases, a stream may not carry timestamps and/or delays may be introduced (e.g., by an inference model) after the timestamps have already been inserted into the streams. Thus, more sophisticated techniques may be used in some embodiments to detect stream misalignments in other ways. For example, FIG. 2 is a diagram illustrating an environment for intelligent coalescing of two image/video media streams 101C-101D using single element comparison according to some embodiments. In some embodiments, upon an initial receipt of the streams, the coalesce engine 106 can perform analysis of the streams to detect what type of stream it is (e.g., a H.264 video stream) using techniques known to those of skill in the art.

In some embodiments, when multiple streams are image-based (that is, are video streams), the coalesce engine 106 can measure a differential between two elements of the streams, e.g., based on comparing the Red Green Blue (RGB) values of each of the frames, to detect frames that correspond to each other.

For example, as shown in FIG. 2, a number of elements of each stream 101C-101D are stored in buffers 204A-204B, which can be a memory such as an on-chip cache or Random-Access Memory (RAM). For a particular test element 206 of a stream 101D, the coalesce engine 106 can generate a representation of the element (e.g., an array/matrix of values such as an RGB image representation, a single value, etc.), and can compare (e.g., via a difference operation known to those of skill in the art) that representation to representations of elements generated from the other buffer 204A to yield difference values 202, allowing the coalesce engine 106 to identify a "best" match (e.g., two representations having no difference, or two representations with a difference that is beneath a threshold value). As illustrated, a number of difference values 202 are generated that indicate an amount of difference between the corresponding compared representations—here, differences of 98, 98, 0, 0, 97, and 97. Thus, the test element 206 can be determined to match potentially two elements from buffer 204A (e.g., by selecting a minimum difference), where one of which can be selected according to a variety of schemes—e.g., select the "first" element that is closest to being evicted from the buffer 204A and sent onward (here, selecting the right-most star as the corresponding element 208), selecting the "last" element, randomly selecting an element, selecting an element that yields a smallest/biggest offset, etc.

In some embodiments, with an identified corresponding element 208, the coalesce engine 106 can identify an offset amount based on the number-of-element difference between the test element 206 and the corresponding element 208 (here, two spots) and use this difference to calculate a time difference between the two elements. However, other embodiments can determine the offset in other ways, such as by preserving a time of receipt associated with each of the elements in the buffer, and then calculating a difference between the receipt times of the test element 206 and the found corresponding element 208. The coalesce engine 106 may then slow down the stream that is determined to be "ahead" of the other—here, stream 101C—by introducing one (or multiple) delays in the transmission of the elements of that stream's buffer (here, buffer 204A). For example, the coalesce engine 106 could immediately pause the sending of elements from buffer 204A by the offset time (while continuing to send elements from buffer 204B) before again sending elements from buffer 204A.

However, in some embodiments, the coalesce engine 106 may not need to determine an offset 120, as it may be able to simply slow down the transmission of elements from the "ahead" buffer while continuing to generate and analyze difference values until the elements "line up" in terms of corresponding elements having a difference value beneath a threshold. Thus, in some embodiments the coalesce engine 106 need not have to determine the speed at which to slow down or speed up (or how long to insert a delay), but instead can start slowing down a stream until it finds the proper alignment. In some embodiments, such comparisons can continue to occur, and slowing down of streams can occur when necessary, to account for dynamic changes that may occur that speed up and/or slow down the streams.

In many cases, the stream 101D that may be "behind" the other stream 101C is a stream that has been subjected to processing (e.g., being used by an inference model) en-route to the coalesce engine 106. However, in some cases it could be the case that a non-processed stream (e.g., a high-quality video stream requiring large bandwidth) could be the slower stream. Beneficially, in some embodiments the coalesce engine 106 does not need to configured to know which stream is delayed from the onset of operations due to being able to automatically detect the offset and the directionality of the misalignment, and moreover, in some embodiments the coalesce engine 106 can detect and remedy scenarios in which one stream may initially be delayed compared to another stream but then later be ahead of the other stream.

Figure 3:
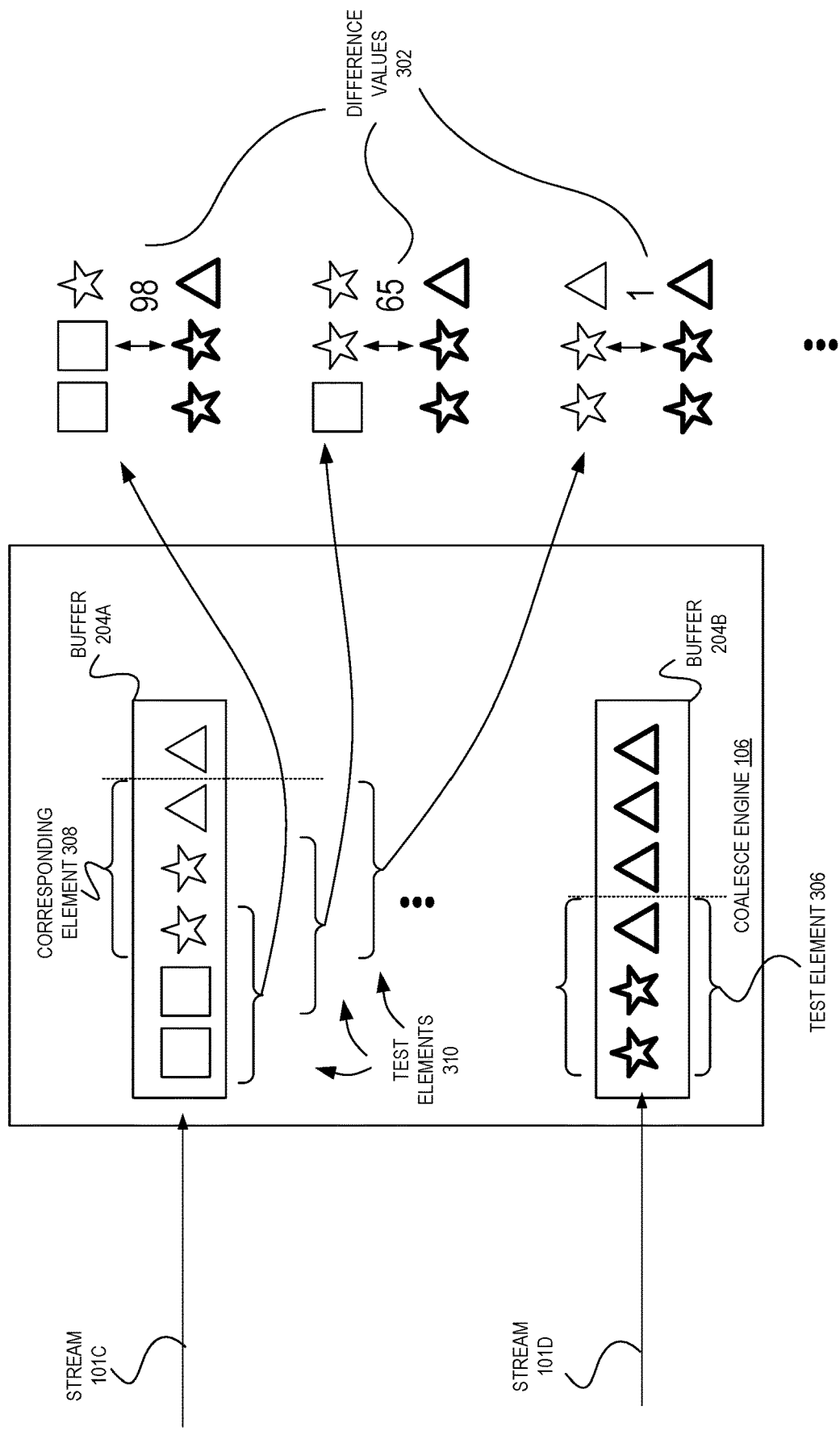
FIG. 3 is a diagram illustrating an environment for intelligent coalescing of two image/video media streams using multi-element comparison according to some embodiments.

In addition to performing a single-element comparison (of a test element 206 comprising a single stream element), some embodiments can perform comparison using multiple elements. For example, FIG. 3 is a diagram illustrating an environment for intelligent coalescing of two image/video media streams using multi-element comparison according to some embodiments. In this case, a group of three elements is selected as a test element 306 and can be compared to similar three-element test elements 310 from the other buffer 204A to again generate multiple difference values 302 that can be used to identify a true alignment and offset. This technique can be used, for example, when multiple elements from the streams are likely to include duplicate (or near duplicate) elements, such as a same image may be shown for a few seconds in a video stream (e.g., the multiple stars or triangles shown herein), to provide better detection of the true corresponding element 308. Thus, the inclusion of multiple consecutive similar/same elements (here, multiple consecutive stars) does not affect the ability to find a "true" alignment and offset.

Figure 4:
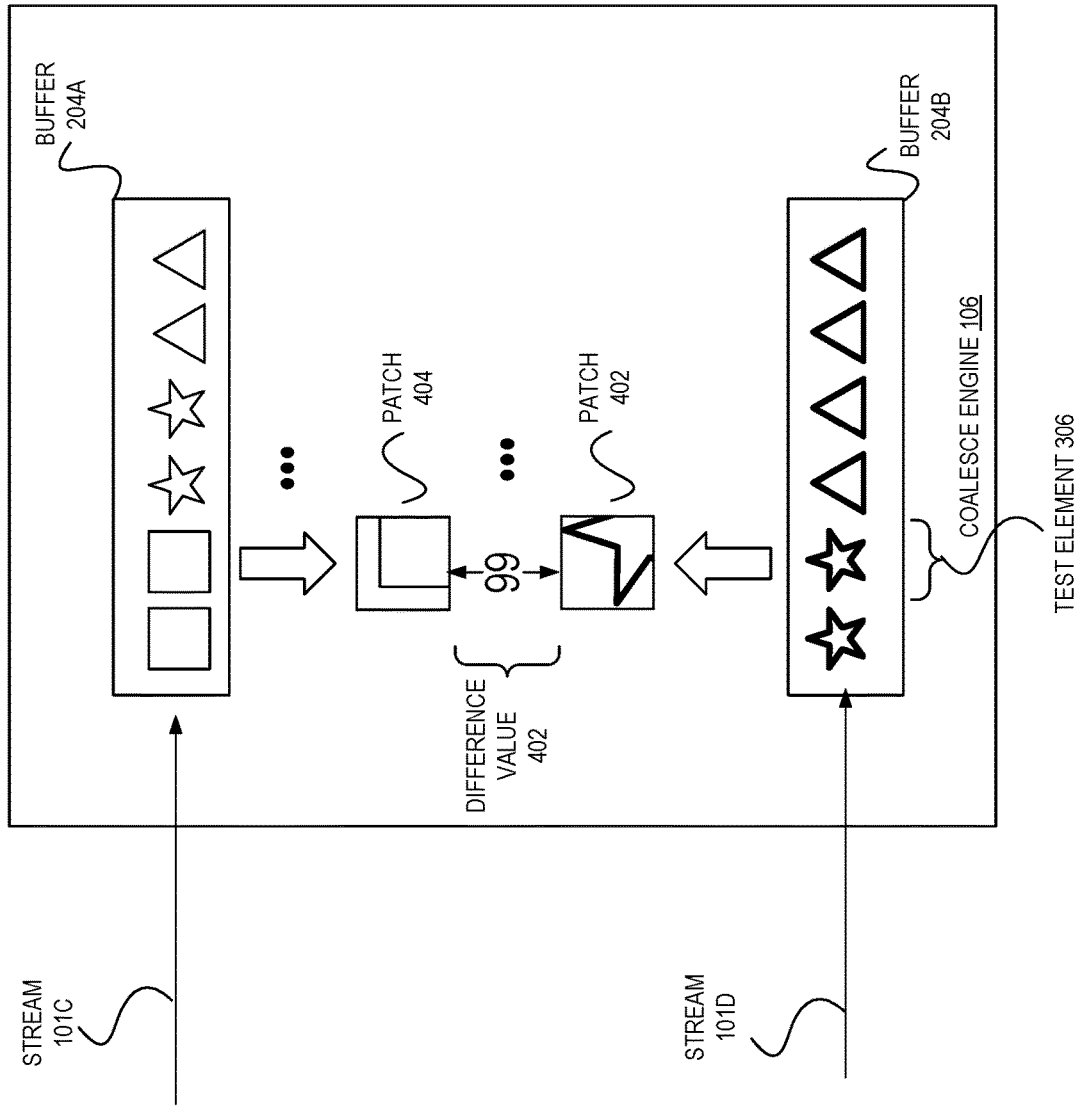
FIG. 4 is a diagram illustrating an environment for intelligent coalescing of two image/video media streams using an image patch comparison technique according to some embodiments.

Another variant involving processing for multiple video streams is shown in FIG. 4, which is a diagram illustrating an environment for intelligent coalescing of two image/video media streams using an image patch comparison technique according to some embodiments. Instead of comparing representations of each full element, some embodiments may instead compare representations of partial images (or "patches")—e.g., a patch 402 that is based on a portion of test element 306 is compared against a corresponding patch 404 from the same portion of other elements from the other buffer 204A. Such patch-based operation can increase the processing speed of the coalesce engine 106, reduce the memory requirements needed, etc.

In addition to processing homogeneous types of media streams—such as the video stream examples provided above, embodiments can also process heterogeneous types of media streams to identify offsets and re-align the streams.

Figure 5:
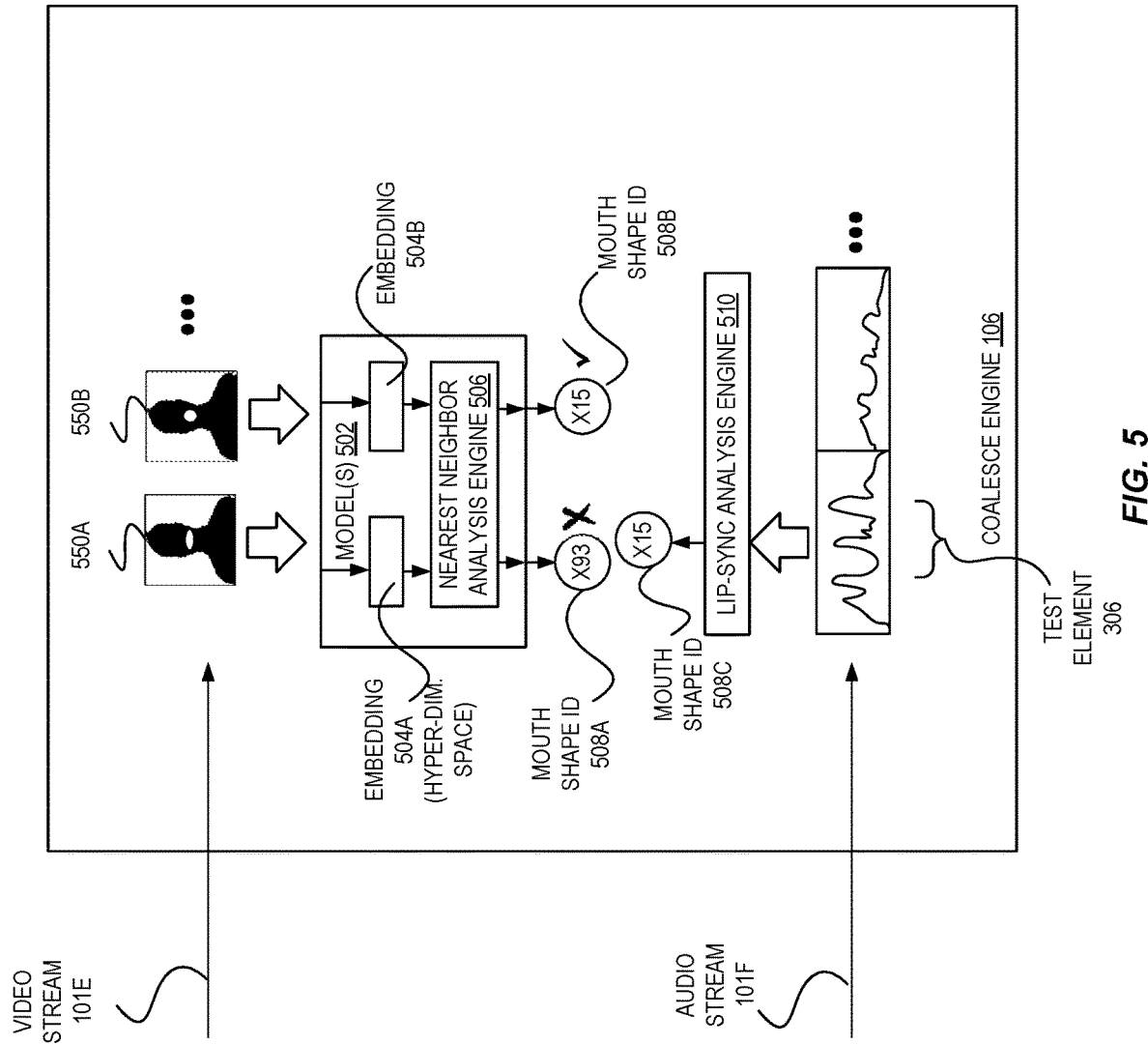
FIG. 5 is a diagram illustrating an environment for intelligent coalescing of a video media stream and an audio media stream according to some embodiments.

FIG. 5 is a diagram illustrating an environment for intelligent coalescing of a video stream 101E and an audio stream 101F according to some embodiments. In some embodiments, elements from different types of media streams can be converted to be placed into different representations that can be compared. As one example, FIG. 5 shows an embodiment where elements (e.g., images) of a video stream 101E can be used to identify particular mouth shapes of people depicted in those elements. For example, the first element 550A may depict a person saying the letter "a" (having a particular extended mouth shape commonly used by people to pronounce the letter) while the second element 550B may depict a person saying the word "oh" (having a different rounded mouth shape commonly used by people when saying this word).

Additionally, mouth shapes can be identified by analyzing elements (e.g., clips) of an audio stream. With the elements of the heterogeneous media streams being placed into a common context—e.g., mouth shapes—the elements can be compared to detect "matching" elements from the streams and thus, the offset between the streams.

The elements 550A-550B of the video stream 101E can be input to one or more machine learning (ML) models 502 (or a portion(s) thereof, such as one or more layers of a neural network that may generate an embedding for a particular input). In the illustrated embodiment of FIG. 5, an element (e.g., a still image) of the video stream 101E can be input to a model 502 (e.g., portions of a convolutional neural network (CNN)) that can convert the input element into a particular embedding 504A (e.g., a vector in hyper-dimensional space). This embedding can be used, for example, with a nearest neighbor analysis engine 506 (that itself may be a separate ML model 502) that can compare the embedding 504A with other similar embeddings that have known mouth-shape labels (e.g., generated using images that have been labeled with the corresponding mouth shapes). Thus, the embedding 504A can be used by the nearest neighbor analysis engine 506 to identify a nearest grouping/cluster and its associated mouth shape identifier 508A, here represented as a mouth shape of type "X93." Similarly, other elements of the video stream 101E can undergo similar processing—e.g., create an embedding 504B, and perform a nearest-neighbor search using the embedding 504B to determine a mouth shape identifier 508B, here represented as being of type "X15."

With the audio stream 101F, the coalesce engine 106 can select a test element 306—here, a fragment or portion of the audio stream 101F (e.g., a chunk of the audio stream 101F of a particular length)—and utilize a lip-sync analysis engine 510 to determine an identifier of a mouth shape that corresponds to a particular audio clip. Such lip-sync analysis engines 510 are known to those of skill in the art, though such engines are commonly used by animators to take a recorded audio segment (e.g., a voice-over for a cartoon), identify a particular mouth shape, and then illustrate a character with that mouth shape. In contrast, such a lip-sync analysis engine 510 can be used to generate a mouth shape identifier 508C (here, represented as "X15") that can be compared, by the coalesce engine 106, against mouth shape identifiers 508A-508B generated from the video stream 101E. In this example, the mouth shape identifier 508C generated from the test element 306 of the audio stream 101F can be determined to be the same as the mouth shape identifier 508B generated from the second video stream 101E element 550B, and as a result an offset can be identified by the coalesce engine 106, allowing the coalesce engine 106 to introduce delay(s) to realign the streams 101E-110F.

The use of mouth shapes, as shown in this figure, is one useful configuration used in some embodiments; however, in other embodiments other types of configurations can be utilized based on the context of use.

Moreover, in some embodiments the coalesce engine 106 can re-align audio streams. A variety of techniques for identifying "matching" audio sample elements can be utilized. As one example, in some embodiments the coalesce engine 106 could employ a genetic algorithm to train a ML model 602 (e.g., a recurrent neural network (RNN)) that maps audio features to mouth shapes, and then the mouth shapes could be compared.

Figure 6:
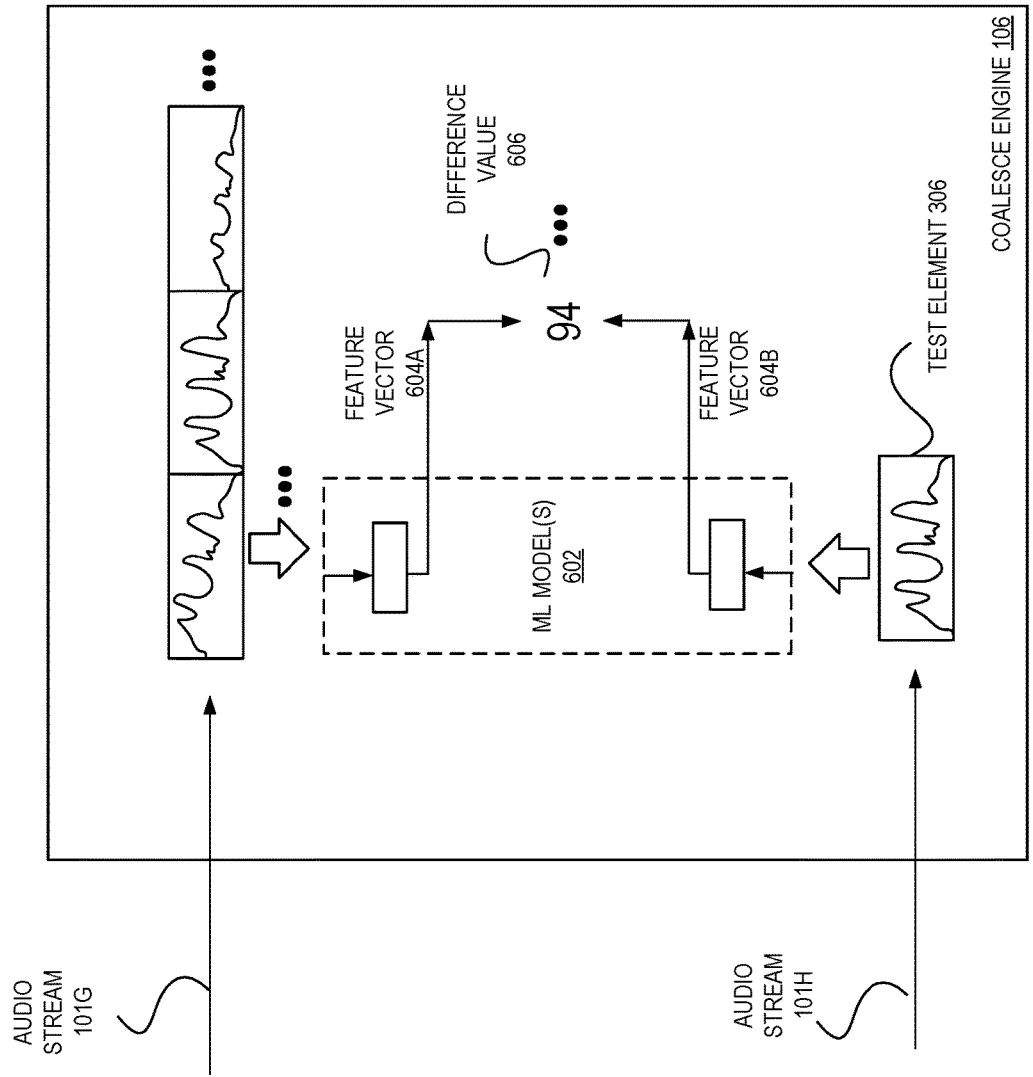
FIG. 6 is a diagram illustrating an environment for intelligent coalescing of two audio media streams according to some embodiments.

As another example, FIG. 6 is a diagram illustrating an environment for intelligent coalescing of two audio media streams according to some embodiments. In this example, the coalesce engine 106 could generate feature vectors 604A-604B from audio stream 101G-110H elements (e.g., using portions of a ML model 602 or other algorithms/logic) to represent the intonation of the elements (e.g., amplitude, frequency, depth, etc.) of a particular sound. These feature vectors 604A-604B can be compared (or "differenced") to determine a particular difference value 606 indicating how different (or alternatively, how similar) the corresponding audio elements are. Similar to earlier-presented examples, a conditional check can be configured such that when a difference value is less than a threshold value (or, greater than a threshold value, etc.) then the coalesce engine 106 can deem the pair of elements under consideration to be a match. Thus, the coalesce engine 106 can compare a particular test element 306 (or group of elements) against one or multiple elements from another audio stream 101G to attempt to identify a matching element, and thereafter begin to introduce a delay or delays to align the speed of the streams such that both are suitable for unification, which can provide a smooth user experience for those systems/users utilizing the streams.

In any of the embodiments shown herein, the process for detecting misalignments can be performed in a variety of ways. For example, this process can be implemented as a continual process with near real-time realignment. In some embodiments, the coalesce engine 106 may sample the streams at some rate, which could be fixed (e.g., configured into the system, which may be user-configured), or an algorithm could be trained based on the rate of elements of the streams arriving (e.g., in terms of frames per second) to tune the sampling rate. Thus, embodiments can utilize a fixed sampling rate and/or an on-demand sampling rate, which could perform a sampling, identify an offset between streams, and intelligently adjust how frequent the coalesce engine 106 should again perform an analysis. As an example, if the coalesce engine 106 performs a sampling some number of times and no drift between streams is observed, the coalesce engine 106 can "back off" the sampling (i.e., increase the delay until another sampling is to occur), which can be computationally more effective than a pure fixed approach. Moreover, some embodiments can perform "regular/fixed" sampling for some amount of time to cause the coalesce engine 106 to ensure a high initial quality while learning how the streams are behaving over time, enabling the coalesce engine 106 to, at some point, switch from the use of rigid fixed durations (or other scheduling) between the analysis of the streams to instead use more frequent or less frequent (or combinations of both, depending on a time of day, day of week, or other event) analysis.

Figure 7:
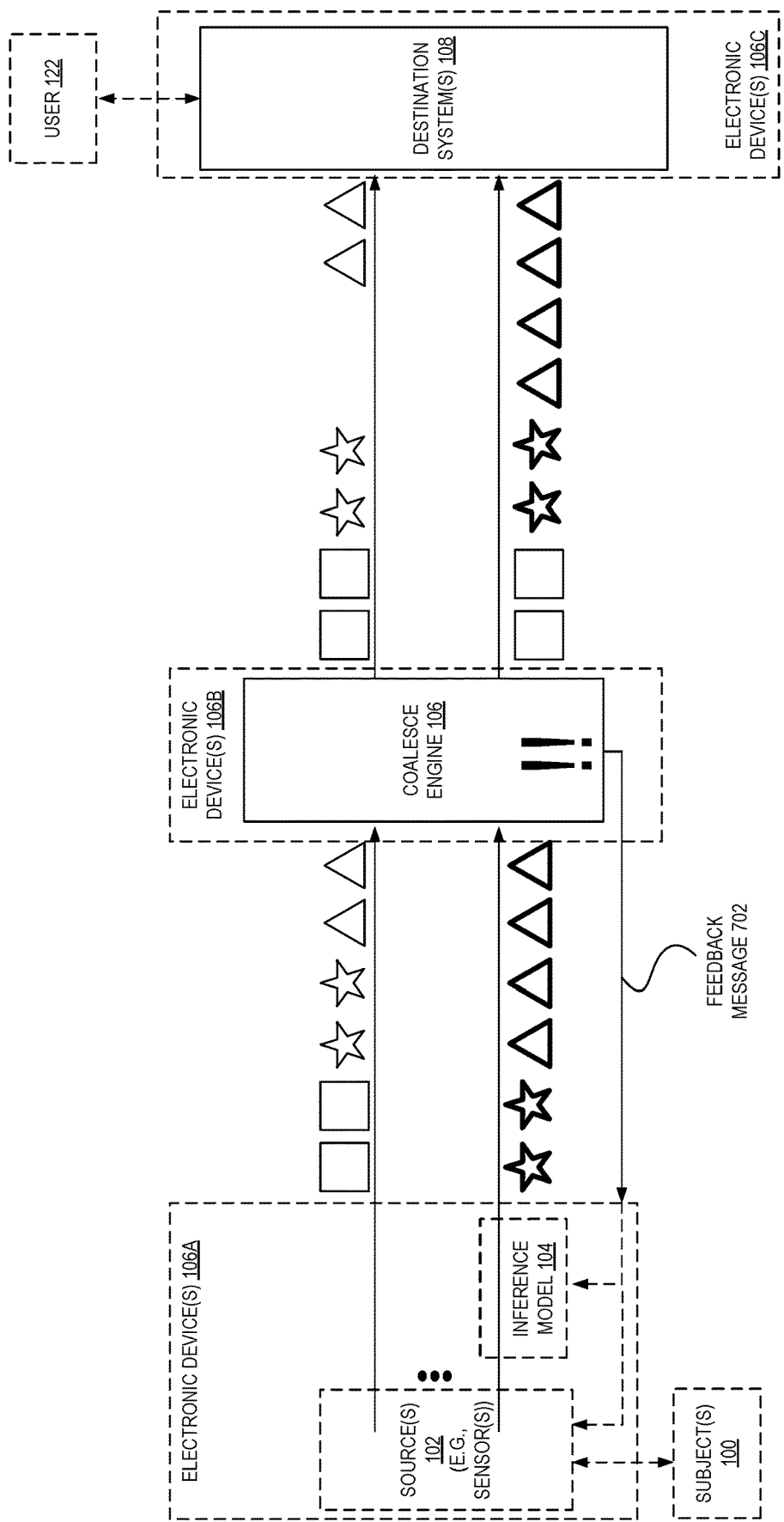
FIG. 7 is a diagram illustrating an environment for intelligent coalescing of media streams including feedback messaging according to some embodiments.

In addition to, or instead of, realigning streams, in some embodiments the coalesce engine 106 may generate feedback. FIG. 7 is a diagram illustrating an environment for intelligent coalescing of media streams including feedback messaging according to some embodiments. The coalesce engine 106, based on detecting a misalignment, can send a feedback message 702 to the stream source(s) 102, an inference model 104 (that may be causing a delay), and/or electronic device(s) 106A that may include the stream source(s) 102 and/or inference model 104. The feedback message 702 may indicate one or multiple streams that are delayed, and may indicate by how much the streams are being delayed (e.g., an offset amount). Additionally or alternatively, the feedback message 702 may include a command indicating what remedial action(s) the recipient should take.

For example, the coalesce engine 106 could detect that one stream is "slower" (continuously, or periodically) than another stream (e.g., due to computation occurring by an inference model 104, due to bandwidth issues, etc.). Based on this detection, the coalesce engine 106 can provide a feedback message 702, which could indicate that the recipient is to increase an amount of bandwidth it is using (if the delay may be caused by a bandwidth limitation), decrease an intensity of computation (e.g., reduce a complexity of the inference model 104), slow down or speed up its transmission by some number of seconds or frames, change a sampling frequency (e.g., for audio streams), change an amount of frames per second being captured (e.g., for video streams), change other settings, etc.

As indicated, such feedback may or may not be combined with the coalesce engine 106 itself realigning streams. Thus, in some cases both operations may be performed, such as is shown in FIG. 7, which can make the system more robust.

The coalesce engine 106 can be deployed in a variety of ways in a variety of locations relative to the other involved entities. Thus, the coalesce engine 106 could be deployed on the "edge", in a cloud network, etc. The optimal placement of the coalesce engine 106 may depend on where the destination system(s) 108 are located that may provide output to a user 122, and/or depend on the availability of computation, memory, etc. For example, if an eventual output occurs on a same device that includes the source(s) 102, then the coalesce engine 106 is to be on the device. However, in many cases the coalesce engine 106 could be elsewhere—e.g., just before a destination system 108 that may use the streams (e.g., display them to a user, perform other analysis, etc.)

Figure 8:
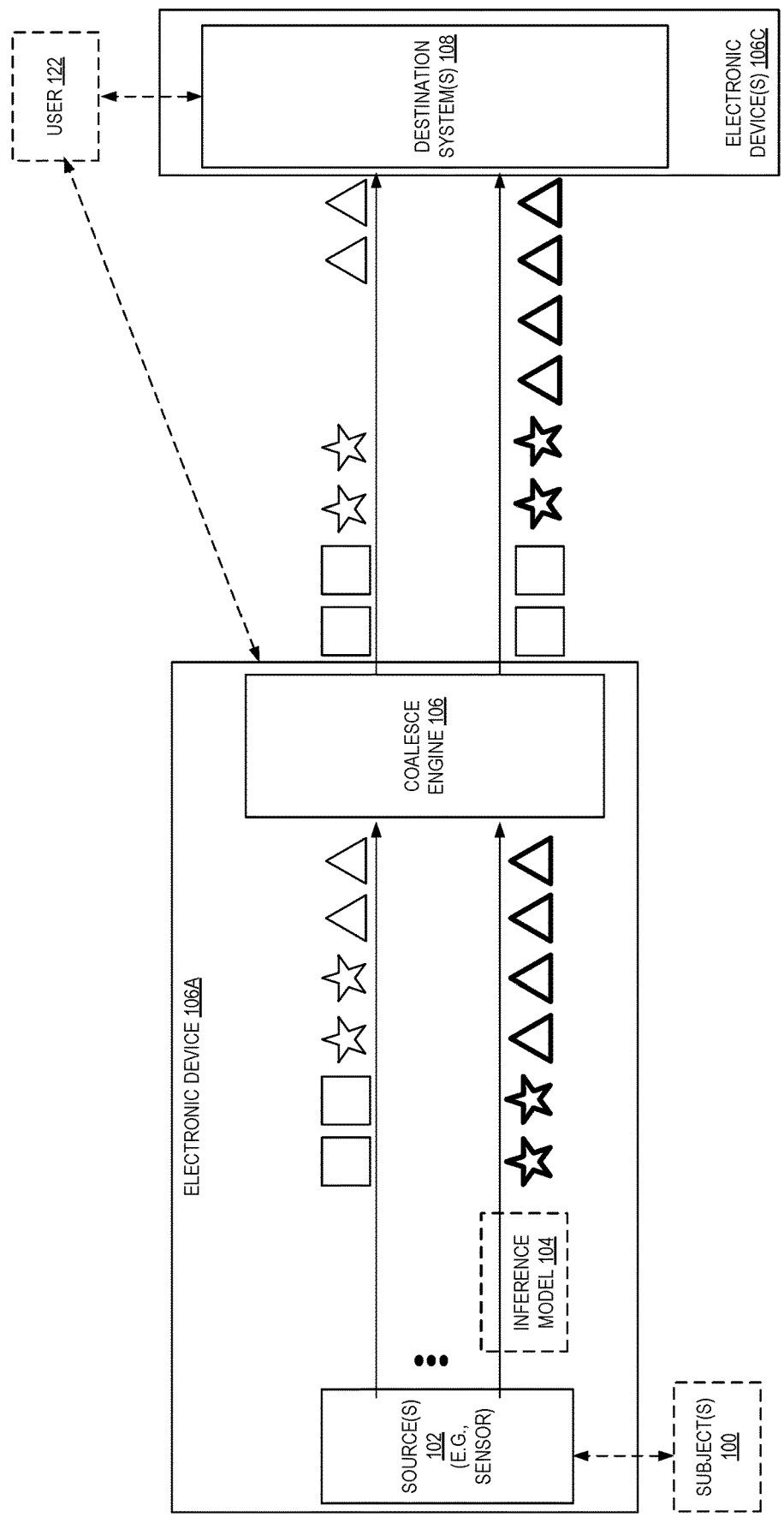
FIG. 8 is a diagram illustrating another exemplary environment for intelligent coalescing of media streams according to some embodiments.

For example, FIG. 8 is a diagram illustrating another exemplary environment for intelligent coalescing of media streams according to some embodiments. In this example, the coalesce engine 106 is implemented on a same electronic device 106A that also includes the source(s) 102 and potentially an inference model 104. An example of such a device 106A could be an "edge" device such as a camera device, smart speaker device, etc. The device 106A could provide the realigned streams to a remote destination system 108, e.g., in a provider network, or could use the realigned streams itself to generate an output directly to a user 122.

Generally, a provider network provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, etc. The users (or "customers") of provider networks may utilize one or more user accounts that are associated with a customer account, though these terms may be used somewhat interchangeably depend ending upon the context of use. Users may interact with a provider network across one or more intermediate networks (e.g., the internet) via one or more interface(s), such as through use of application programming interface (API) calls, via a console implemented as a website or application, etc. The interface(s) may be part of, or serve as a front-end to, a control plane of the provider network that includes "backend" services supporting and enabling the services that may be more directly offered to customers.

To provide these and other computing resource services, provider networks often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

Figure 9:
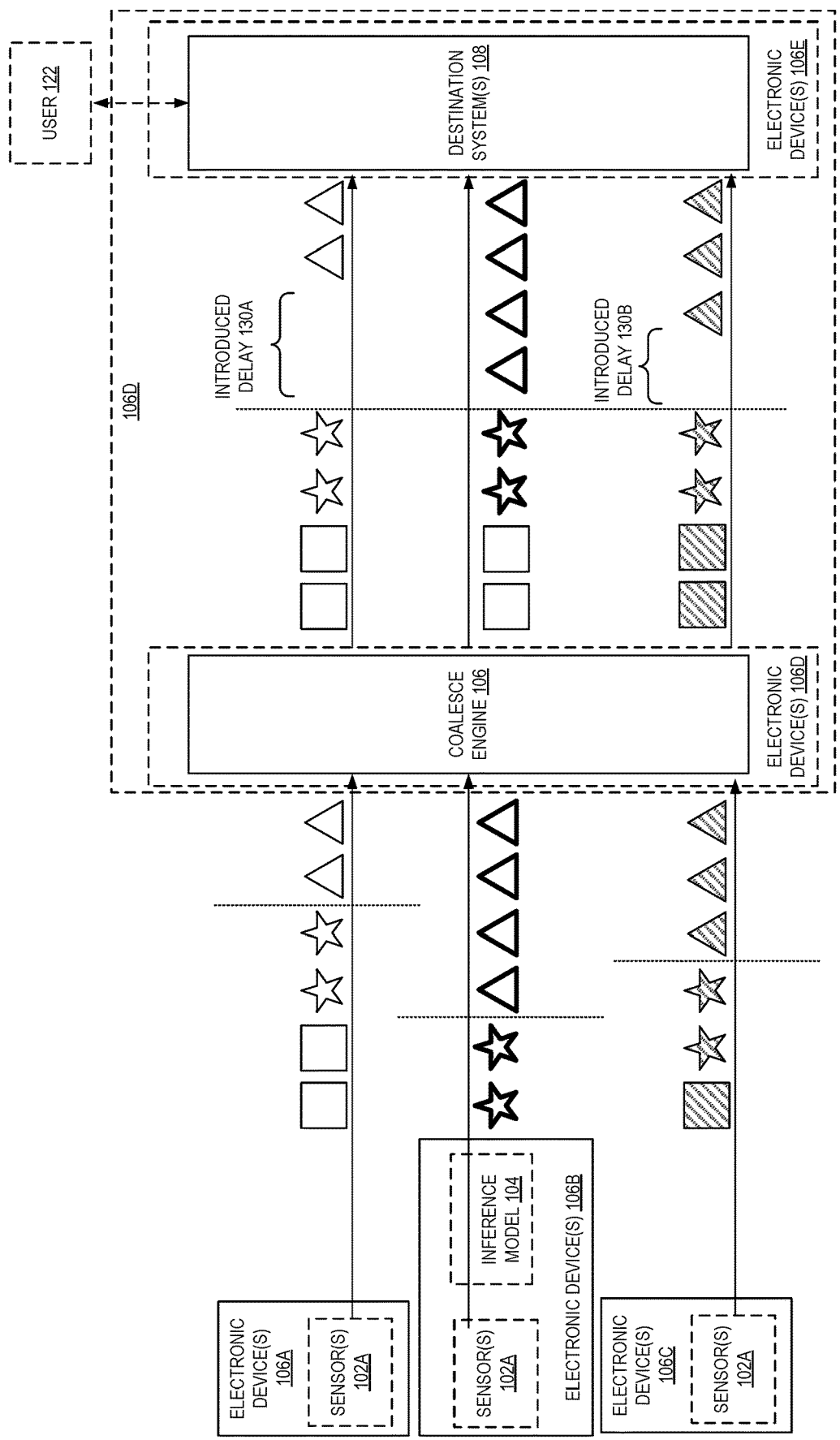
FIG. 9 is a diagram illustrating yet another exemplary environment for intelligent coalescing of at least three media streams according to some embodiments.

FIG. 9 is a diagram illustrating yet another exemplary environment for intelligent coalescing of at least three media streams according to some embodiments. This example environment shows a number of deployment possibilities together—i.e., multiple source electronic devices 106A-106C, more than two streams being realigned (e.g., via delays 130A-130B, which can be of different sizes), a coalesce engine 106 potentially being on a same device 106D as the destination system(s) 108, etc.—though these can be used independently of the others or in different combinations. As another example, the coalesce engine 106 and/or the destination system(s) 108 could be implemented in a provider network, while the electronic device(s) are outside of the provider network (e.g., in one or more customer networks).

Figure 10:
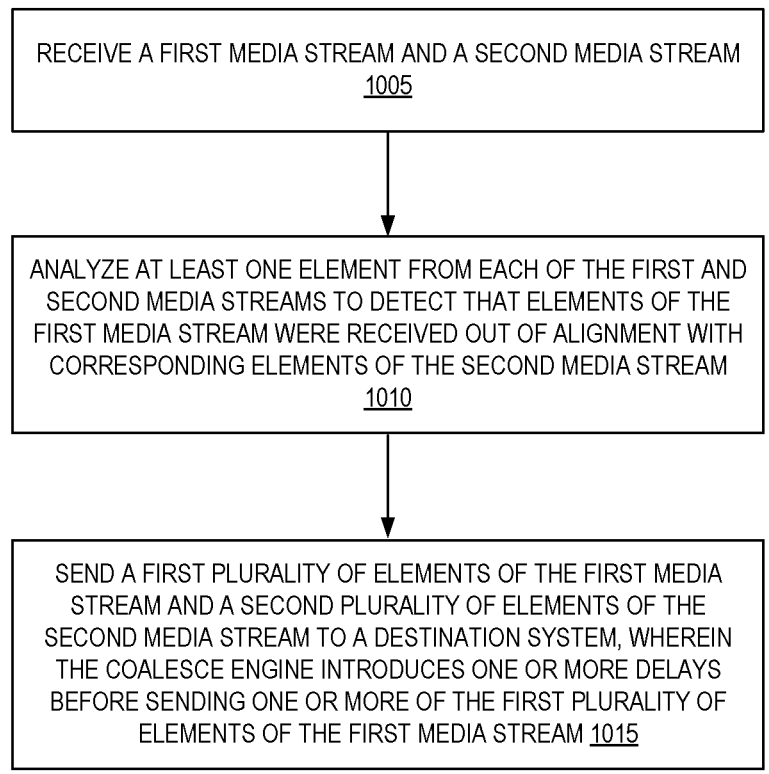
FIG. 10 is a flow diagram illustrating operations of a method for intelligent coalescing of media streams according to some embodiments.

FIG. 10 is a flow diagram illustrating operations of a method for intelligent coalescing of media streams according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by the coalesce engine 106 of the other figures.

The operations 1000 include, at block 1005, receiving a first media stream and a second media stream. In some embodiments, the first media stream and the second media stream carry data pertaining to a common subject (e.g., a common geographic area/region such as a room or portion of the outdoors or area of a vehicle, a common event (e.g., a sports event)). In some embodiments, the first media stream and the second media stream are each one of a video stream or an audio stream.

The operations 1000 include, at block 1010, analyzing at least one element from each of the first and second media streams to detect that elements of the first media stream were received out of alignment with corresponding elements of the second media stream.

In some embodiments where the first media stream and the second media stream are each a video stream, block 1010 includes generating a difference value between a first representation of a first element of the first media stream and each of a plurality of representations of a plurality of elements of the second media stream; and selecting one of the plurality of elements of the second media stream as corresponding to the first element based on the generated difference values.

In some embodiments where the first media stream is an audio stream and the second media stream is a video stream, block 1010 includes: generating a mouth shape identifier from a first element of the first media stream; generating a plurality of mouth shape identifiers from a plurality of elements of the second media stream; and selecting one of the plurality of elements of the second media stream as corresponding to the first element based on comparing the mouth shape identifier with one or more of the plurality of mouth shape identifiers. In some embodiments, generating the plurality of mouth shape identifiers comprises: utilizing at least a portion of one or more machine learning models to create a plurality of embeddings for the plurality of elements; and performing a nearest neighbor analysis with the plurality of embeddings.

In some embodiments, where the first media stream and the second media stream are both audio streams, block 1010 includes generating a feature vector from a first element of the first media stream; generating a plurality of feature vectors from a plurality of elements of the second media stream; and selecting one of the plurality of elements of the second media stream as corresponding to the first element based on comparing the feature vector with one or more of the plurality of feature vectors.

The operations 1000 also include, at block 1015, sending a first plurality of elements of the first media stream and a second plurality of elements of the second media stream to a destination system, wherein the coalesce engine introduces one or more delays before sending one or more of the first plurality of elements of the first media stream.

In some embodiments, the operations 1000 further include determining (e.g., as part of block 1010) that a current alignment between corresponding elements of the first and second media streams meets or exceeds a threshold (e.g., set by a user associated with the source of the media streams, generated/selected by the coalesce engine, etc.), and the introduction of the one or more delays (e.g., in block 1015) occurs responsive to the current alignment meeting or exceeding the threshold.

In some embodiments, the operations 1000 are performed by coalesce engine 106 of the other figures. The coalesce engine 106 may executes on a same electronic device that generates the first media stream and the second media stream; the coalesce engine 106 may execute on a different electronic device than another one or more electronic devices that generate the first media stream and the second media stream. In some embodiments, the coalesce engine is implemented in a provider network.

In some embodiments, in addition to (or in alternate to) introducing one or more delays (as part of block 1015), the operations 1000 further include sending a feedback message to a source of the first media stream indicating that the first media stream is out of alignment from the perspective of the coalesce engine with regard to the second media stream. The feedback message may indicate that the source is to perform one or more of: increasing an amount of bandwidth used to send the first media stream; decreasing a complexity of a machine learning (ML) model that processes the first media stream; or changing a framerate or frequency of capturing data for the first media stream.

In some embodiments, block 1010 may be performed repeatedly according to a schedule (e.g., a fixed scheduling with regular, defined intervals) or performed dynamically (e.g., based on results of previous occurrences of block 1010, such as increasing the time between occurrences when low misalignment is detected and/or decreasing the time between occurrences when high misalignment is detected.

Figure 11:
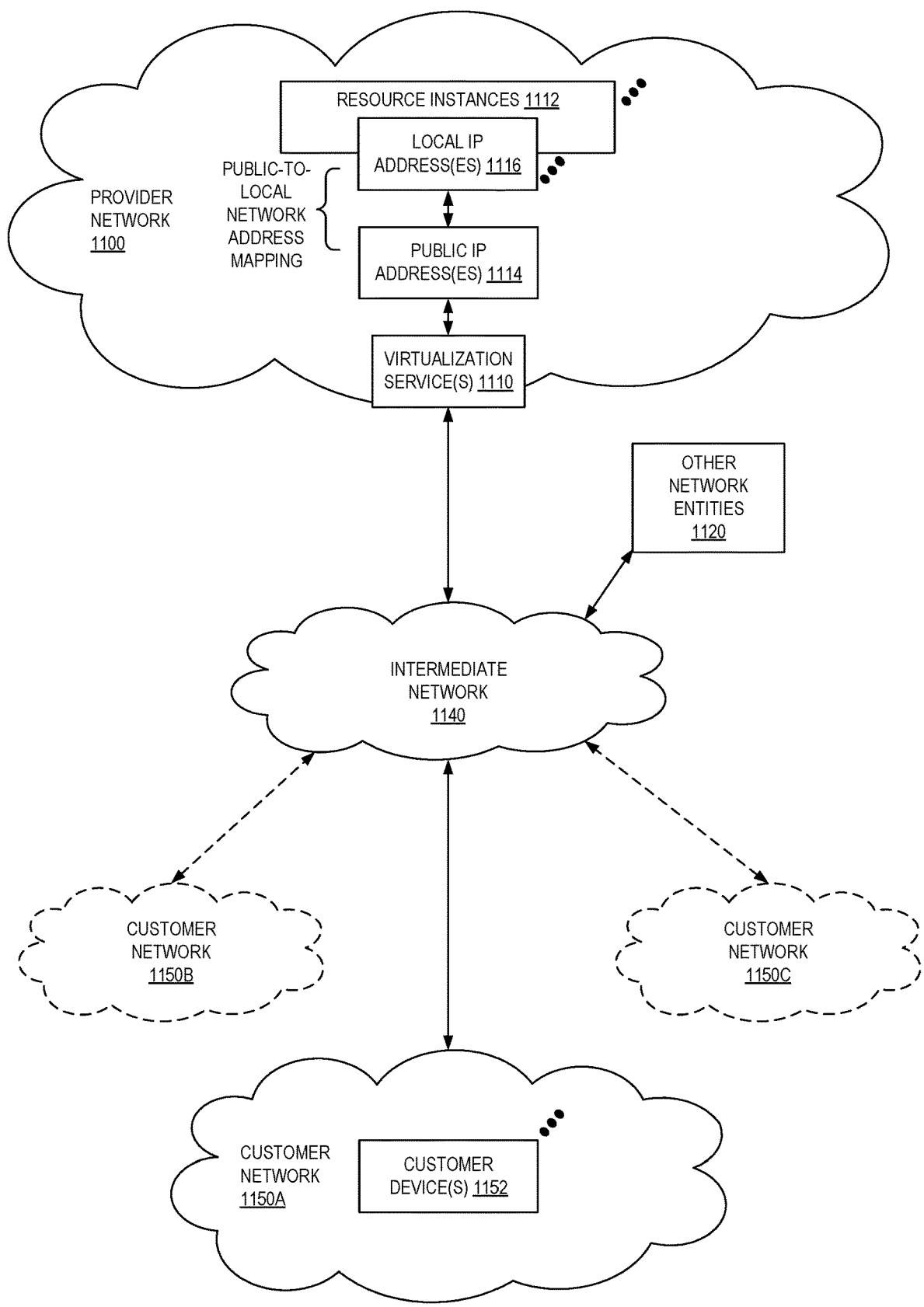
FIG. 11 illustrates an example provider network environment according to some embodiments.

FIG. 11 illustrates an example provider network (or "service provider system") environment according to some embodiments. As indicated above, in some embodiments the coalesce engine 106 may be implemented within a provider network, and in some cases one or more of the source(s) 102 and destination systems 108 may also be implemented within a provider network.

A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local IP addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Illustrative System

Figure 12:
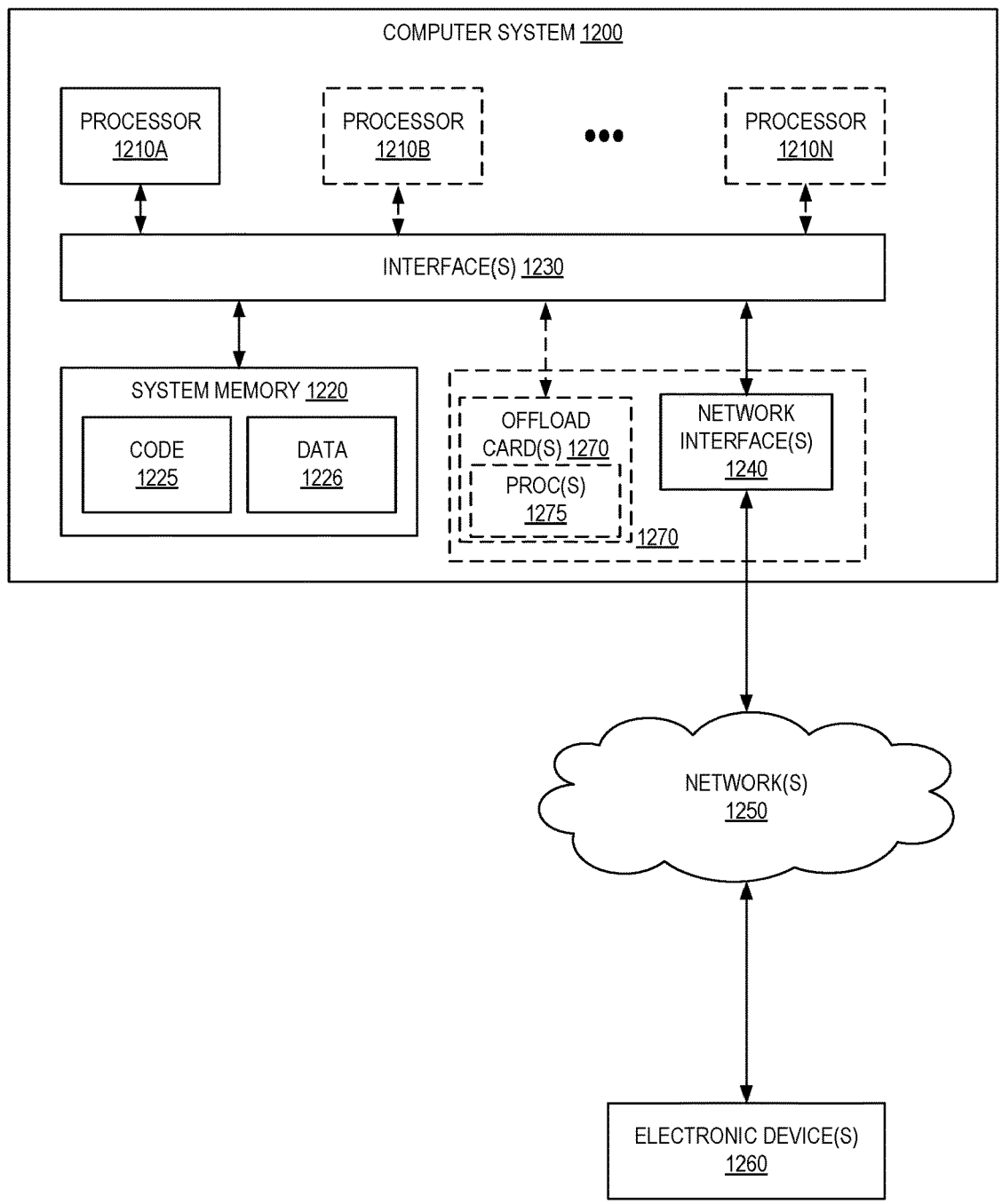
FIG. 12 is a block diagram illustrating an example computer system that may be used in some embodiments.

In some embodiments, a system that implements a portion or all of the techniques for intelligent coalescing of media streams as described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some embodiments the offload card(s) 1270 can perform compute instance management operations such as pausing and/or un-pausing compute instances, launching and/or terminating compute instances, performing memory transfer/copying operations, etc. These management operations may, in some embodiments, be performed by the offload card(s) 1270 in coordination with a hypervisor (e.g., upon a request from a hypervisor) that is executed by the other processors 1210A-1210N of the computer system 1200. However, in some embodiments the virtualization manager implemented by the offload card(s) 1270 can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HyperText Transfer Protocol (HTTP) servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 101A-101N, 204A-204B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a coalesce engine, a first media stream and a second media stream;
   analyzing, by the coalesce engine, at least one element from each of the first and second media streams to detect that elements of the first media stream were received out of alignment with corresponding elements of the second media stream;
   sending, by the coalesce engine, a first plurality of elements of the first media stream and a second plurality of elements of the second media stream to a destination system, wherein the coalesce engine introduces one or more delays before sending one or more of the first plurality of elements of the first media stream; and sending a feedback message to a source of the first media stream indicating that the first media stream is out of alignment from the perspective of the coalesce engine with regard to the second media stream.

2. The computer-implemented method of claim 1, wherein:
the first media stream and the second media stream carry data pertaining to a common subject; and
the first media stream and the second media stream are each one of a video stream or an audio stream.

3. The computer-implemented method of claim 2, wherein the first media stream and the second media stream are each a video stream, and wherein analyzing the at least one element of the first and second media streams comprises:
generating a difference value between a first representation of a first element of the first media stream and each of a plurality of representations of a plurality of elements of the second media stream; and
selecting one of the plurality of elements of the second media stream as corresponding to the first element based on the generated difference values.

4. The computer-implemented method of claim 2, wherein:
the first media stream is an audio stream and the second media stream is a video stream; and
analyzing the at least one element of the first and second media streams comprises:
generating a mouth shape identifier from a first element of the first media stream;
generating a plurality of mouth shape identifiers from a plurality of elements of the second media stream; and
selecting one of the plurality of elements of the second media stream as corresponding to the first element based on comparing the mouth shape identifier with one or more of the plurality of mouth shape identifiers.

5. The computer-implemented method of claim 4, wherein generating the plurality of mouth shape identifiers comprises:
utilizing at least a portion of one or more machine learning models to create a plurality of embeddings for the plurality of elements; and
performing a nearest neighbor analysis for each of the plurality of embeddings to identify the plurality of mouth shape identifiers.

6. The computer-implemented method of claim 2, wherein:
the first media stream and the second media stream are both audio streams; and
analyzing the at least one element of the first and second media streams comprises:
generating a feature vector from a first element of the first media stream;
generating a plurality of feature vectors from a plurality of elements of the second media stream; and
selecting one of the plurality of elements of the second media stream as corresponding to the first element based on comparing the feature vector with one or more of the plurality of feature vectors.

7. The computer-implemented method of claim 1, further comprising:
determining, by the coalesce engine, that a current alignment between corresponding elements of the first and second media streams meets or exceeds a threshold, wherein the introduction of the one or more delays occurs responsive to the current alignment meeting or exceeding the threshold.

8. The computer-implemented method of claim 1, wherein the coalesce engine executes on a same electronic device that generates the first media stream and the second media stream.

9. The computer-implemented method of claim 1, wherein the coalesce engine executes on a different electronic device than another one or more electronic devices that generate the first media stream and the second media stream, wherein the coalesce engine is implemented in a provider network.

10. The computer-implemented method of claim 1, wherein the feedback message indicates that the source is to perform one or more of:
increasing an amount of bandwidth used to send the first media stream;
decreasing a complexity of a machine learning (ML) model that processes the first media stream; or
changing a framerate or frequency of capturing data for the first media stream.

11. The computer-implemented method of claim 1, further comprising:
after an amount of time, performing another analysis, by the coalesce engine, of additional elements of the first and second media streams to detect whether the additional elements of the first media stream and the second media stream were received out of alignment.

12. A system comprising:
a plurality of sources that generate a plurality of media streams; and
a coalesce engine implemented by one or more electronic devices, the coalesce engine including instructions that upon execution cause the coalesce engine to:
receive a first media stream and a second media stream that were generated by the plurality of sources;
analyze at least one element from each of the first and second media streams to detect that elements of the first media stream were received out of alignment with corresponding elements of the second media stream;
send a first plurality of elements of the first media stream and a second plurality of elements of the second media stream to a destination system, wherein the coalesce engine introduces one or more delays before sending one or more of the first plurality of elements of the first media stream; and
send a feedback message to a source of the first media stream indicating that the first media stream is out of alignment from the perspective of the coalesce engine with regard to the second media stream.

13. The system of claim 12, wherein the first media stream and the second media stream are both video streams, and wherein the coalesce engine, to analyze the at least one element of the first and second media streams, is to:
generate a difference value between a first representation of a first element of the first media stream and each of a plurality of representations of a plurality of elements of the second media stream; and
select one of the plurality of elements of the second media stream as corresponding to the first element based on the generated difference values.

14. The system of claim 12, wherein:
the first media stream is an audio stream;
the second media stream is a video stream; and the coalesce engine, to analyze the at least one element of the first and second media streams, is to:
- generate a mouth shape identifier from a first element of the first media stream;
- generate a plurality of mouth shape identifiers from a plurality of elements of the second media stream; and
- select one of the plurality of elements of the second media stream as corresponding to the first element based on comparing the mouth shape identifier with one or more of the plurality of mouth shape identifiers.

15. The system of claim 12, wherein:
the first media stream and the second media stream are both audio streams; and
the coalesce engine, to analyze the at least one element of the first and second media streams, is to:
- generate a feature vector from a first element of the first media stream;
- generate a plurality of feature vectors from a plurality of elements of the second media stream; and
- select one of the plurality of elements of the second media stream as corresponding to the first element based on comparing the feature vector with one or more of the plurality of feature vectors.

16. A computer-implemented method comprising:
receiving, at a coalesce engine, a first media stream and a second media stream, wherein the first media stream and the second media stream carry data pertaining to a common subject, and wherein the first media stream is an audio stream and the second media stream is a video stream;
analyzing, by the coalesce engine, at least one element from each of the first and second media streams to detect that elements of the first media stream were received out of alignment with corresponding elements of the second media stream, the analyzing comprising:
- generating a mouth shape identifier from a first element of the first media stream;
- generating a plurality of mouth shape identifiers from a plurality of elements of the second media stream, comprising:
  - utilizing at least a portion of one or more machine learning models to create a plurality of embeddings for the plurality of elements; and
  - performing a nearest neighbor analysis for each of the plurality of embeddings to identify the plurality of mouth shape identifiers; and
- selecting one of the plurality of elements of the second media stream as corresponding to the first element based on comparing the mouth shape identifier with one or more of the plurality of mouth shape identifiers; and sending, by the coalesce engine, a first plurality of elements of the first media stream and a second plurality of elements of the second media stream to a destination system, wherein the coalesce engine introduces one or more delays before sending one or more of the first plurality of elements of the first media stream.

17. The computer-implemented method of claim 16, further comprising:
determining, by the coalesce engine, that a current alignment between corresponding elements of the first and second media streams meets or exceeds a threshold, wherein the introduction of the one or more delays occurs responsive to the current alignment meeting or exceeding the threshold.

18. The computer-implemented method of claim 16, wherein the coalesce engine executes on a same electronic device that generates the first media stream and the second media stream.

19. The computer-implemented method of claim 16, wherein the coalesce engine executes on a different electronic device than another one or more electronic devices that generate the first media stream and the second media stream, wherein the coalesce engine is implemented in a provider network.

20. The computer-implemented method of claim 16, further comprising:
sending a feedback message to a source of the first media stream indicating that the first media stream is out of alignment from the perspective of the coalesce engine with regard to the second media stream.

* * * * *